Patented Mar. 17, 1942

2,276,503

UNITED STATES PATENT OFFICE 2,276,503

IODIZED CALCIUM CARBONATE

Brack B. McHan, Quincy, Ill., assignor to Calcium Carbonate Company, Chicago, Ill., a corporation of Illinois No Drawing. Application November 6, 1935, Serial No. 48,601

9 Claims. (Cl. 99—2)

This invention relates to feedstuffs, and more particularly has reference to an ingredient therefor, and especially relates to an iodized calcium carbonate for incorporation with other constituents of the feed.

It is well known that the natural feeds in certain sections of the country are strikingly deficient in iodine content. To make up for this deficiency, it has been attempted to supply iodine in the proper amounts to the feed of livestock. Specifically, two methods have been generally followed.

In one case, salt, which is usually one of the constituents of a manufactured feedstuff, is iodized—that is, there is mixed with the sodium chloride a suitable iodine salt, such as potassium iodide, in the proper amount. This mixture of sodium chloride and potassium iodide is then incorporated in the feedstuff. This method, however, is open to very serious objections. In the first place, the mixture of potassium iodide with salt results in oxidation of the potassium iodide, with a consequent loss of free iodine by volatilization. Investigation has shown that practically all of the iodine is lost in a few months' time.

In the second place, it is physically impossible to secure a uniform mixture of potassium iodide with salt. As can be appreciated, the percentage of potassium iodide to salt is relatively small. However, even if it were possible to initially obtain a uniform mix, the potassium iodide subsequently will separate from the salt, due to the marked difference in specific gravity of the two substances. I have found in certain instances that there is almost twice as much potassium iodide at the bottom of a bag of such a mixture as there is at the top. Consequently, the manufacturers of feedstuffs are unable to rely on iodide salt as a means of incorporating the exact percentage of iodine desired.

Attempts have also been made to secure a proper iodine content in mixed feeds by using finely powdered potassium iodide and introducing as little as 0.01% of the same directly into the mixed feed. The principal objection to this was the difficulty of uniformly incorporating a relatively minute quantity of a very heavy substance (potassium iodide) with a very large quantity of a relatively light substance (the mixed feed). Uniformity of mixture is not only impossible, but it is extremely expensive to secure even a semblance of uniformity. It will of course be appreciated that it is absolutely essential that the iodine be distributed throughout the feed.

In this second method, there has also been generally experienced a loss in iodine, as in the case of iodized salt. As in the case of iodized salt, the potassium iodide crystals exist as free entities, and are therefore readily acted on by any oxidizing condition, which is usually prevalent in the average mixed feed.

In view of the foregoing, feed manufacturers generally look upon the iodizing of mixed feeds with great skepticism, or have abandoned the idea altogether.

To overcome the above objections is one of the objects of my invention.

Another object of my invention is to provide a process and means for insuring a uniform distribution of iodine throughout a mixed feed.

Yet another object of my invention is to introduce iodine into a mixed feed under such conditions that there is no appreciable loss in iodine value over a considerable period of time.

A further object of this invention is to secure a physical or chemical or electrical union between an iodine containing substance and an ingredient of a feed.

A still further object of my invention is to provide a process whereby iodine is introduced into a mixed feed in association with another constituent of the feed which serves to uniformly distribute the iodine and also to prevent volatilization.

To accomplish the above and other important objects, my invention in general embraces the concept of associating an iodine containing substance with a constituent of the mixed feed prior to their incorporation in the body of such feed. More specifically, the other constituent should be capable of serving as a vehicle for the uniform distribution of the iodine substance throughout the mass of the feed mixture, and should, either by itself or in association with other agents, retard, if not actually prevent, oxidation of the iodine substance. In the preferred embodiment of my invention, I provide for an intimate association of potassium iodide with calcium carbonate, but it will be appreciated that other iodine substances may be employed, and other vehicles than calcium carbonate may be used. It is also to be understood that there may be included with the potassium iodide and calcium carbonate, if necessary, an agent to further prevent loss of the iodine.

I shall, however, describe my invention with reference to calcium carbonate and potassium iodide.

Several different methods may be followed in securing the association of calcium carbonate and potassium iodide, as above mentioned. Preferably I apply a solution of potassium iodide to the calcium carbonate prior to grinding of the calcium carbonate. In this instance, the iodine solution may be supplied to the feed of the calcium carbonate for the grinding mill, such as a ring roll, pebble, ball mill or other form of pulverizer which may be used to grind limestone to a fine powder. In this way the limestone and iodide salt are ground together in the mill to a fine powdered condition.

The resultant product is a mass of pulverized particles of limestone, each one being uniformly coated with the iodide salt. While I do not wish to be limited by my theories pertaining to this coating, I believe that the uniformity is a result of each of the particles becoming wetted by the solution and the subseqeunt evaporation of the water. I also believe that there is unquestionably an electrical attraction between the limestone particles and the potassium iodide.

During the process of grinding, it appears that individual electrons are liberated by the abrasion and friction of the grinding operation, and that these electrical charges serve to coat the limestone with the potassium iodide.

I have found that oxidation of the potassium iodide, with its consequent volatilization of the iodine, may be effectively prevented by maintaining a sufficient alkalinity, usually at a pH value of not less than 8. The usual calcium carbonates are slightly alkaline, and thereby tend to prevent oxidation of the potassium iodide. However, if this is not sufficient, then a suitable alkaline agent, such as sodium carbonate, may be added to the potassium iodide solution to raise the pH value to the particular limit desired. This alkaline agent is preferably incorporated in the solution of potassium iodide.

The extent to which the calcium carbonate is iodized may vary within relatively wide limits, depending upon the particular feed requirements. As a typical specific illustration, when it is desired to have a calcium carbonate iodized at the rate of 4.7 pounds of potassium iodide to the ton of calcium carbonate, and where the mill is running at the rate of 4.5 tons per hour, the solution may be fed at the rate of 3 gallons per hour. 20 gallons of solution may be made up by adding 141 pounds of potassium iodide and 7 pounds of sodium carbonate. It will be noted that in this instance the alkaline reagent, sodium carbonate, was necessary in order to secure the proper buffer action to prevent oxidation of the potassium iodide. As indicated above, however, under certain circumstances, and particularly where the alkalinity of the calcium carbonate is relatively high, the alkaline reagent may be omitted.

The above is the preferred method of practicing my invention. However, there are various modifications which may be made. For instance, a slightly different process consists in applying the solution of the iodide salt after grinding of the limestone. In such instance, a solution of potassium iodide, made up for the desired strength, and with or without the addition of a buffer agent, as may be necessary, is atomized onto the ground limestone as it passes from the mill through the usual air circulating pipes connected to the mill fan and cyclone. A suitable atomizing spray head, located in the side of one of the air circulating pipes, serves to subject the finely pulverized limestone, as it is carried along by the air currents, to a finely atomized mist of the solution. It will be noted in this instance, however, that the deposit of the iodide salt on the individual particles of the pulverized limestone, is accomplished solely by the evaporation of the water portion of the solution, and I do not believe that there is the electrical reaction which appears to be present in the preferred process.

A further modification of my invention involves the production of a highly iodized calcium carbonate, and then the mixing of the same with untreated calcium carbonate. The highly iodized calcium carbonate may be produced by treating a given weight of calcium carbonate in a mixer with a relatively strong solution of an iodide salt. The calcium carbonate may then be dried and pulverized. Obviously, this resultant product contains a very high percentage of iodine, much in excess of that desired in the ultimate product. The dried, pulverized and highly iodized calcium carbonate may then be fed, by means of any suitable regulating feeder, into the feed for the grinding mill, where the rock is pulverized. While each individual particle of the finished product is not uniformly coated with the iodine salt, there is a high uniformity of distribution of iodine in the finished product, and oxidation of the potassium iodide is inhibited.

A still further modification of this invention embraces the concept of using a highly concentrated calcium carbonate-iodide salt produced by a dry mix, and using such highly concentrated batch to iodize the final product to the extent desired. The concentrated batch may be made up by dry grinding a given weight of potassium iodide with a predetermined weight of calcium carbonate in a ball, pebble or ring roll mill, or any other suitable form of pulverizer. For instance, in one run, I form such a dry mix by using 14.1 pounds of potassium iodide, 14.8 pounds of calcium carbonate, and .705 pound of sodium carbonate (a buffer reagent being necessary). This concentrated mix was fed into the mill feeder which was feeding the rock into the mill to be pulverized at the rate of 85.3 grams of the mix in each 15-second interval, and mill operating at a rate to produce 4.6 tons of calcium carbonate per hour. This resulted in a product having 4.7 pounds of potassium iodide per ton of calcium carbonate.

A slightly different modification of the process just described involves the feeding of the dry concentrated mix into the flow of calcium carbonate as it leaves the mill or other grinding medium. This, however, is not as desirable as the preceding process.

And again, instead of preliminarily making up a concentrated calcium carbonate-potassium iodide mixture, the potassium iodide, either alone or in conjunction with a suitable buffer reagent, such as sodium carbonate, may be fed in a dry state into the grinding mill along with the charge. If desired, there may be mixed with the potassium iodide the desired amount of sodium carbonate to serve as a buffer reagent. For instance, I have used a mixture of 100 pounds of potassium iodide and 5 pounds of sodium carbonate, and then used this mixture to secure a finished product having 4.7 pounds potassium iodide per ton of calcium carbonate.

The above examples are of course merely exemplary, and various other modifications, whereby the basic concept of my invention may be employed, will suggest themselves to persons skilled in the art.

The advantages of my invention will of course be apparent. The intimate association of the potassium iodide with the calcium carbonate, and particularly if a buffer reagent is employed, insures the stability of the potassium iodide over long periods of time, and even when subjected to accelerated oxidation tests the loss in iodine content has been found to be negligible. In the second place, exhaustive tests have shown that there is a highly uniform distribution of iodine in or on the calcium carbonate. Particularly in the case of the potassium iodide solution, no amount of shaking or screening can separate the potassium iodide from the pulverized calcium carbonate, in view of the close physical union existing between the two.

It will be appreciated that these properties are carried over into the mixed feed. In other words, the stability of the potassium iodide is insured, even in the presence of those oxidants found in certain feeds. Furthermore, the potassium iodide is uniformly distributed in the feed and is retained in such state of uniform distribution.

As indicated above, any iodine salt, but preferably alkaline, may be used in lieu of the potassium iodide mentioned above, and also any suitable alkaline or buffering reagent may be used in lieu of the sodium carbonate referred to herein. The calcium carbonate may be in any form, whether limestone carrying a certain percentage of calcium carbonate, a precipitated product, or any other form, either in the raw state, or treated, as for instance as shown in my copending application Serial No. 44,997.

While I have shown and described the preferred embodiment of my invention, I wish it to be understood that I do not confine myself to the precise details herein set forth by way of illustration, as it is apparent that many changes and variations may be made therein, by those skilled in the art, without departing from the spirit of the invention, or exceeding the scope of the appended claims.

I claim:

1. A process of iodizing calcium carbonate comprising forming a solution of potassium iodide and an alkaline substance, and dispersing said alkaline potassium iodide uniformly throughout a mass of calcium carbonate.

2. As a composition of matter, pulverized calcium carbonate having the particles thereof uniformly coated with potassium iodide.

3. A method of preparing iodized calcium carbonate comprising applying an alkaline solution of an iodide salt to calcium carbonate and evaporating the solvent to thereby deposit the iodide salt and alkaline reagent upon the calcium carbonate.

4. A process of iodizing calcium carbonate comprising applying a solution of an iodide salt to calcium carbonate, and then pulverizing the calcium carbonate.

5. As a composition of matter, a mass of pulverized calcium carbonate in which the particles thereof carry potassium iodide, the said mass having a pH value of not less than 8.

6. A process of iodizing calcium carbonate comprising uniformly dispersing a relatively small amount of an iodide of an alkali metal throughout a mass of discrete particles of the calcium carbonate, and maintaining the pH value of the resultant mass at not less than eight.

7. A process of iodizing a feed constituent comprising uniformly dispersing a relatively small amount of an iodide of an alkali metal throughout said constituent and incorporating a sufficient amount of an alkaline reagent to insure a pH value of the resultant mass of not less than eight.

8. A process of iodizing calcium carbonate comprising grinding a relatively small amount of potassium iodide with calcium carbonate, and adding sufficient sodium carbonate to raise the alkalinity to a pH value of not less than eight, to thereby prevent oxidation of the potassium iodide.

9. A composition of matter comprising a mass of discrete particles of calcium carbonate, said particles carrying a stabilized iodide of an alkali metal.

BRACK B. McHAN.